(12) United States Patent
Lamport (10) Patent No.: US 7,797,457 B2
(45) Date of Patent: Sep. 14, 2010

(54) LEADERLESS BYZANTINE CONSENSUS

(75) Inventor: Leslie Lamport, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1169 days.

(21) Appl. No.: 11/373,483

(22) Filed: Mar. 10, 2006

(65) Prior Publication Data

US 2007/0214355 A1    Sep. 13, 2007

(51) Int. Cl.
*G06F 15/16* (2006.01)
(52) U.S. Cl. .................... 709/248; 709/201; 709/227
(58) Field of Classification Search ............. 709/201, 709/203, 224, 226, 248; 713/100, 154, 156, 713/163; 370/254, 255
See application file for complete search history.

(56) References Cited

U.S. PATENT DOCUMENTS

| | | | | |
|---|---|---|---|---|
| 6,463,532 | B1 * | 10/2002 | Reuter et al. | 709/224 |
| 2002/0129087 | A1 * | 9/2002 | Cachin et al. | 709/200 |
| 2004/0103138 | A1 * | 5/2004 | Lamport et al. | 709/201 |
| 2005/0089131 | A1 * | 4/2005 | Howell et al. | 377/1 |

OTHER PUBLICATIONS

"Paxos Made Simple" Leslie Lamport ACM Sigact News (Distributed Computing Column) 2001 pp. 51-58.*
"Fast Paxos" Leslie Lamport Microsoft Research Jul. 8, 2006.*
Castro, M. et al., "Practical Byzantine Fault Tolerance", *Proceedings of the 3rd Symposium on Operating Design and Implementation ACM*, 1999, 173-186.
Chandra, T.D. et al., "Unreliable Failure Detectors for Reliable Distributed Systems", *Journal of the ACM*, 1996, 43(2), 225-267.
Dwork, C, et al., "Consensus in the Presence of Partial Synchrony", *Journal of the ACM*, 1988, 35(2), 288-323.
Fischer, M.J. et al., "Impossibility of Distributed Consensus with one Faulty Process", *Journal of the ACM*, 1985, 32(2), 374-382.
Lamport, L. "The Part-Time Parliament", *ACM Transactions on Computer Systems*, 1998, 16(2), 133-169.
Lamport, L., "Paxos made Simple",*ACM Sigact News (Distributed Computing Column)*, 2001, 32(4), 51-58.
Lamport, L., "Fast Paxos", *Technical Report, MSR-TR-2005-112*, Jul. 2005, Microsoft Research, 1-40.
Lamport, L., "Generalized Consensus and Paxos", *Technical Report, MSR-TR-2005-33*, Mar. 2005, Microsoft Research, 59 pages.

(Continued)

*Primary Examiner*—Wing F Chan
*Assistant Examiner*—Jonathan Willis
(74) *Attorney, Agent, or Firm*—Woodcock Washburn LLP (57) ABSTRACT

The leader server proposing commands or sequences of commands to be executed by a plurality of servers according to an asynchronous consensus algorithm, such as Paxos, is replaced with a synchronous virtual leader agreement algorithm executed by each of the servers. The synchronous agreement algorithm used to determine the virtual leader's actions is called the leader agreement algorithm. The asynchronous consensus agreement algorithm performed by the virtual leader and the servers may be the Paxos algorithm. However, any asynchronous Byzantine agreement algorithm may be used. By replacing the leader in the Paxos consensus algorithm with a synchronous virtual leader agreement algorithm, the Paxos algorithm can survive a Byzantine failure of one or more leader server, as long as the servers are behaving synchronously.

15 Claims, 4 Drawing Sheets

OTHER PUBLICATIONS

Martin, J-P. et al., "Fast Byzantine Consensus", *Proceedings of the International Conference on Dependable Systems and Networks (DSN 2005)*, Jun. 2005, *IEEE Computer Society*, 1-10.

Pease, M. et al., "Reaching Agreement in the Presence of Faults", *Journal of the ACM*, 1980, 27(2), 228-234.

Schneider, F.B., "Understanding Protocols for Byzantine Clock Synchronization", *Technical Report TR87-859*, Aug. 1987, Cornell University, 37 pages.

Schneider, F.B., "Implementing Fault-Tolerant Services using the State Machine Approach: A Tutorial", *ACM Computing Surveys*, 1990, 22(4), 299-319.

* cited by examiner

LEADERLESS BYZANTINE CONSENSUS

BACKGROUND

An increasingly popular method of deriving use and value from the unused resources of powerful modem personal computing devices is a distributed computing system in which the computing devices act in coordination with one another to provide more reliable access to data and computational resources. An advantage of distributed systems is the ability to continue to operate in the face of physical difficulties that would cripple a single, larger computing device. Such difficulties could include sustained power outages, inclement weather, flooding, and terrorist activity, for example.

To compensate for the increased risk that individual member computing devices may become disconnected from the network, turned off, suffer a system malfunction, or otherwise become unusable, redundancy can be used to allow the distributed computing system to remain operational. Thus, the information stored on any one computing device can be redundantly stored on at least one additional computing device, allowing the information to remain accessible, even if one of the computing devices fails. Distributed systems may be particularly useful for increasing the reliability of servers in client/server systems, for example.

A state machine is an abstract device that executes a command, or a sequence of commands and produces an output. The state machine maintains a current state, and when executing a command generally produces an output, and a new internal state. Most distributed systems can be described using state machines.

In the state machine approach, a distributed system may be implemented using a general algorithm in which a network of servers correctly execute the state machine so long as no more than some maximum number of failures occur. The state machine may be implemented by having each server separately simulate the state machine, using a sequence of commands agreed upon by the servers. Each server may do this separately by executing a consensus algorithm for agreeing on the next command. In this manner, each server in the system will maintain an identical state with respect to one another ensuring that the servers appear to a client device as a single server, and the risk to the client of any one server failing is minimized.

A synchronous distributed system is one in which a process taking too long to perform an operation or a message taking too long to be delivered are considered to be failures. One such example of a synchronous distributed system is an aircraft control system. A typical aircraft control system requires input from a variety of sensors and cockpit readings. These inputs are then used/processed to determine what actions a variety of devices should take (e.g., rudders, wing flaps, etc.). Because these devices need to act quickly and synchronously to avoid the potential death of the passengers, little message delay in the system can be tolerated.

In contrast, an asynchronous system is one in which no bound is placed on the time it takes for a correct process to perform an operation or for a message to be delivered. For example, a client/server banking system may be an example of such an asynchronous system. While, it may be desirable that messages be delivered and operations be performed, it is not critical if messages or transactions are somewhat delayed.

A normally synchronous system is one in which, most of the time, the system is behaving synchronously. Synchronous behavior means that operations by nonfaulty processes and delivery of a message from one nonfaulty process to another occur within known time bounds. A normally synchronous system may have arbitrarily long periods during which it does not behave synchronously, but it will eventually resume synchronous behavior.

The initial algorithms for implementing the state-machine approach were developed for process-control systems. The rapid response requirement of process control can be achieved only with a synchronous system. Later, client/server systems were considered. Their less stringent response requirements enable them to be implemented on the asynchronous distributed systems common today.

Fault-tolerant consensus algorithms for asynchronous systems have been shown not to exist. As a result, algorithms were developed that worked in normally synchronous systems. A popular example of such an algorithm is the Paxos consensus algorithm. Several variants of Paxos have appeared, including Fast Paxos and Generalized Paxos, for example. Consensus algorithms like Paxos that assume normally synchronous system are usually called asynchronous.

Synchronous consensus algorithms are generally unsuitable for a normally synchronous system because loss of synchrony can cause inconsistency. For example, different servers may begin executing different sequences of commands, and their simulation of the state machine may begin to diverge. An asynchronous algorithm, on the other hand, by definition maintains consistency despite arbitrary delays. However, an asynchronous consensus algorithm still requires that message delay be finite in order to progress. Thus, progress can be ensured by an asynchronous algorithm only when the system is behaving synchronously.

In general, such asynchronous consensus algorithms use a leader, usually chosen to be one of the servers. The leader may be responsible for proposing one or more commands for the servers to execute. When a leader server fails, or is otherwise made unavailable, a new leader may be selected through an election. Paxos uses a leader election algorithm that eventually elects a single nonfaulty leader as long as the system generally behaves synchronously. Progress is guaranteed when the system is synchronous and there is a single leader that is nonfaulty. Consistency is maintained even if there are multiple leaders or while there is no leader.

While the above described systems are suitable for failures where a leader becomes unavailable or unresponsive, they fail to account for Byzantine failures. A malicious or Byzantine failure is one in which the failed process or server can perform arbitrary operations. Byzantine hardware failures are improbable, and are of concern only in safety-critical process control applications. However, a malicious hacker who gains control of a server can also cause a Byzantine failure. While Algorithms for client/server systems (i.e., synchronous) that can in theory tolerate Byzantine failures are available (e.g., Byzantine Paxos, Fast Byzantine Paxos, and the Castro-Liskov algorithm), in practice they have difficulty distinguishing the Byzantine failure of a leader from ordinary message delay.

SUMMARY

The leader server proposing commands or sequences of commands to be executed by a plurality of servers according to an asynchronous consensus algorithm, such as Paxos, is replaced with a synchronous virtual leader algorithm executed by each of the servers. The synchronous agreement algorithm used to determine the virtual leader's actions is called the leader agreement algorithm. The asynchronous consensus agreement algorithm performed by the virtual leader and the servers may be the Paxos algorithm. However, any asynchronous Byzantine agreement algorithm may be used. By replacing the leader in the Paxos consensus algorithm with a synchronous virtual leader algorithm, the Paxos algorithm can survive a Byzantine failure of one or more leader servers, so long as the servers are behaving synchronously.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including handheld devices, multi-processor systems, microprocessor based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
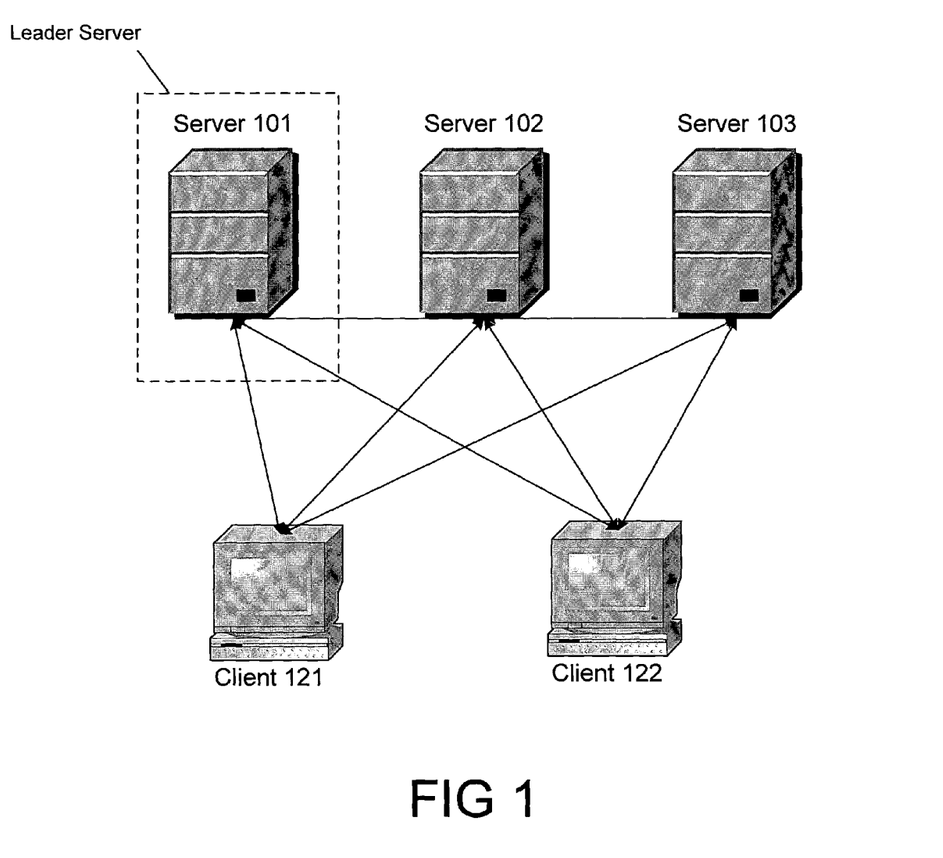
FIG. 1 is a diagram illustrating an exemplary distributed system executing an asynchronous consensus algorithm in accordance with the present invention.

FIG. 1 is an illustration of an exemplary system implementing an asynchronous consensus algorithm. This algorithm may be the Paxos consensus algorithm, however, any asynchronous consensus algorithm known in the art may be used. Examples of such consensus algorithms include Fast Paxos, Generalized Paxos, Byzantine Paxos, Fast Byzantine Paxos, and the Castro-Liskov algorithm.

The system comprises servers 101, 102, and 103, however, there is no limit to the number of servers that can be supported by the invention. The goal of the Paxos consensus algorithm, or any asynchronous consensus algorithm, is to have each of servers 101, 102, 103 execute the same sequence of commands. Executing the same sequences of commands ensures that the servers remain synchronized with respect to one another. These commands may be proposed by one or more client devices 121, and 122, for example.

To facilitate this, a particular server may act as a leader. For example, server 101 may be the leader, however, any one of the servers may act as a leader. In addition, there may be more than one leader. The leader server 101 is illustrated by the hash box on FIG. 1.

Each of the servers 101, 102, and 103 may receive different commands from the clients 121 and 122. In order to synchronize (i.e., execute the same sequence of client commands) the leader server 101 may propose commands or sequences of commands to be executed in proposals. The leader server 101 may initiate one or more numbered proposals starting with 0.

Each proposal may have two phases. In addition, each phase may comprise a part a and a part b. In part a of a phase, the leader 101 sends a message to each of the servers 101, 102, and 103. In part b of a phase, the servers 101, 102, and 103 reply to the leader 101.

In phase 1a, the leader 101 desirably sends a proposal number to the servers 101, 102, and 103. In phase 1b, the servers 101, 102, and 103 may either respond to the leader 101 that the proposal is the highest proposal number they have received thus far, or they may respond with the highest proposal number that they had previously voted for. A proposal with a higher proposal number may have been submitted by another leader (not shown), for example. In addition to responding to the leader that the proposal is the highest-numbered one they have received, the servers may send information about what they've done for previous proposal numbers.

If phase 1 succeeds (i.e., the leader 101 does not learn of a higher numbered proposal that has been voted for), the leader 101 may propose a command, or sequence of commands that the servers 101, 102, or 103 should execute, in its 2a message. The message desirably proposes a sequence containing all of the client commands that have not already been chosen in a previous proposal.

Each server may then determine whether to vote for the execution of a command or sequence of commands or reject it. A server desirably only rejects a proposed command or commands if it has responded to another leader's suggestion of a higher proposal number. If a sufficient number of servers, known as a quorum, vote for the proposal, the proposal is said to have been agreed upon, and each server desirably performs the associated commands and can transmit the results. In such a manner, each of the servers can perform the same actions in the same order, maintaining the same state among all of the servers.

Figure 2:
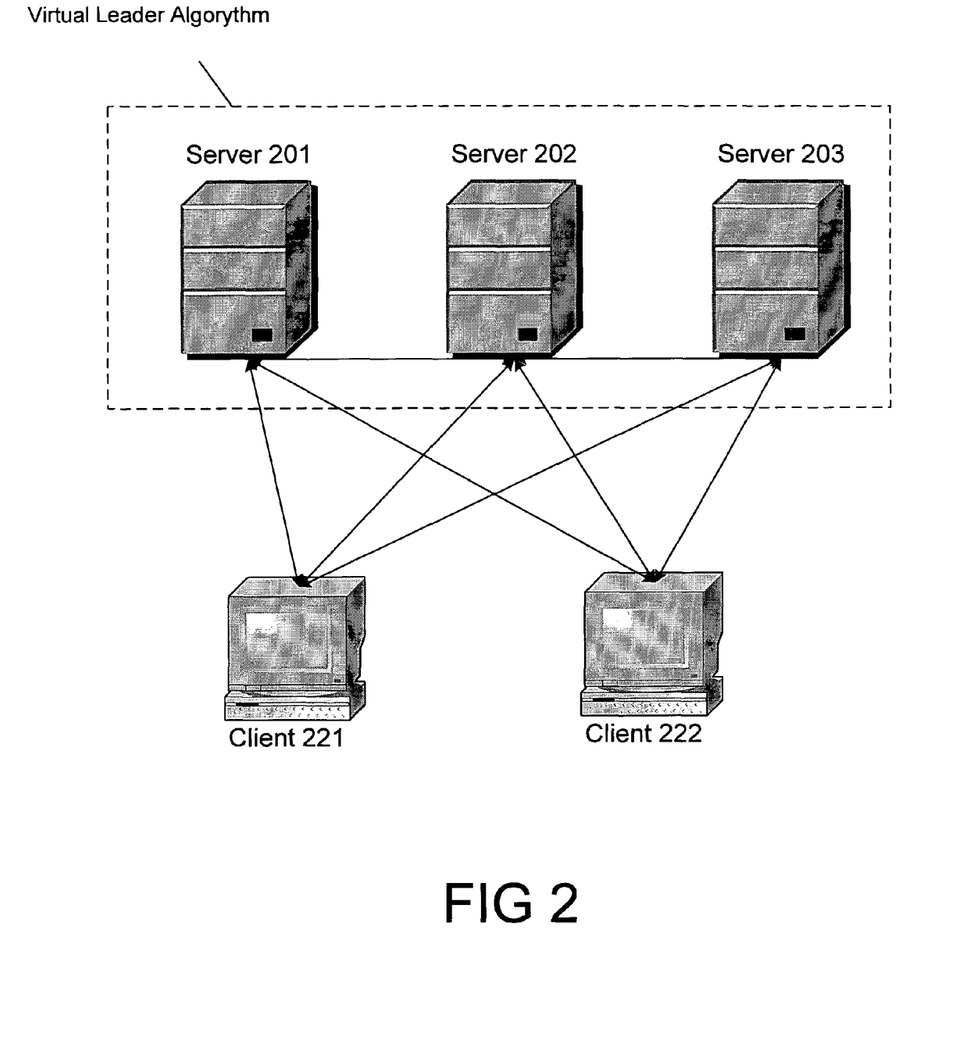
FIG. 2 is a diagram illustrating an exemplary distributed system executing an asynchronous consensus algorithm including a synchronous virtual leader agreement algorithm in accordance with the present invention.

FIG. 2 is a diagram illustrating an exemplary system implementing the asynchronous agreement algorithm with a virtual leader. The system comprises servers 201, 202, and 203, however, there is no limit to the number of servers that can be supported by the invention. Similarly to FIG. 1, the goal of the Paxos consensus algorithm with the virtual leader is to ensure that each of servers 201, 202, 203 execute the same sequence of commands. These commands may be proposed by one or more client devices 221, and 222, for example.

As described above, a problem associated with using a leader is Byzantine failures. If one or more of the leaders become malicious, the agreement algorithm may be unable to make progress, or worse, some of the servers may execute incorrect commands. A solution to this problem is instead of relying on one or more leader servers that can fail, the role of the leader is replaced by a virtual leader. The virtual leader may be comprised of virtual leader agreement algorithm processes executing at each of the servers in the system. The virtual leader determines which commands should be proposed by executing a synchronous consensus algorithm.

To implement the virtual leader, each server 201, 202, and 203 may execute an instance of a virtual leader agreement algorithm. As shown in the hash box on FIG. 2, the virtual leader algorithm is desirably executed by each of the servers in the group of servers.

Because there is no longer a centralized leader server, messages that in the ordinary Paxos algorithm were previously sent to the leader server are instead desirably sent to all the virtual leader agreement algorithm instances executing at the servers 201, 202, and 203.

For example, instead of a server sending its phase b message to the leader as described in FIG. 1, the server instead sends its phase b message to the processes executing the virtual leader agreement algorithm on each of the servers 201, 202, and 203.

The virtual leader agreement algorithm processes at all the servers may then use a synchronous agreement algorithm to choose a vector of proposed messages. The vector desirably contains a message proposed by each of the servers. This synchronous agreement algorithm ensures that any two nonfaulty servers get the same vector of proposed messages, and that the vector element for each nonfaulty server contains the message proposed by that server. The virtual leader agreement algorithm processes at each server may then use a deterministic procedure to choose the message to be sent by the virtual leader and each server may then act as if they had received that message.

Because synchronous agreement algorithms assume that all processes begin executing the algorithm at nearly the same time. The servers 201, 202, and 203 desirably synchronize their execution of the virtual leader agreement algorithm. To facilitate this, the servers 201, 202, and 203 are desirably synchronized to some time difference $\epsilon$. The value of $\epsilon$ affects how long it takes a synchronous virtual leader agreement algorithm to choose a value. Each of the servers may synchronize their clocks to some reliable standard using a GPS, for example. However, any system, method, or technique known in the art for clock synchronizing may be used.

Each of the virtual leader processes executing on the servers 201, 202, and 203 may begin at a fixed starting time $T_0$. Further, a time interval $\Delta$ may be chosen such that a complete execution of phase 1 or phase 2 of a proposal, including the virtual leader agreement algorithm can be made.

Accordingly, execution of the virtual leader agreement algorithm that chooses the message sent by the virtual leader in phase p of proposal number b of the Paxos algorithm for choosing the $i^{th}$ state-machine command is begun at time $T_0+(i+2b+p-3)\Delta$. For example, at time $T_0+41\Delta$, the execution will begin for:

Phase 2 of proposal number 0 in the execution of Paxos for choosing the $42^{nd}$ command, Phase 1 of proposal number 1 for choosing the $41^{st}$ command.

Phase 2 of proposal number 1 for choosing the $40^{th}$ command.

Phase 1 of proposal number 2 for choosing the $39^{th}$ command.

. . .

Phase 1 of proposal number 21 for choosing the $1^{st}$ command.

Therefore, in the interval from time $T_0+41\Delta$ to time $T_0+42\Delta$, the servers 201, 202, and 203 are executing 42 different phases, where each of those phases is a phase of a proposal for a different execution of the Paxos algorithm or other asynchronous consensus algorithm. The corresponding messages sent by a particular server for each different phase may be sent to each of the processes executing the virtual leader agreement algorithm. However, rather than send 42 different messages, the messages are desirably first bundled into a single physical message. For example, a server may send a single compact physical message containing its initial message in each of the 42 executions of the leader agreement algorithm in which it proposes a message for the virtual leader.

When the system is behaving synchronously during times $T_0+41\Delta$ through $T_0+42\Delta$, all of the phases executed during that time succeed, and the servers 201, 202 and 203 know that the $1^{st}$ through $41^{st}$ commands for the servers to execute have been chosen. Therefore, the instance of the virtual leader agreement algorithm executing at each of the servers desirably propose not sending leader messages for, and therefore not initiating, any of these phases except phase 2 of proposal number 0 for choosing the $42^{nd}$ command. Accordingly, physical messages sent by a particular server comprise non-null information only for the execution that chooses the $42^{nd}$ command, for example.

Figure 3:
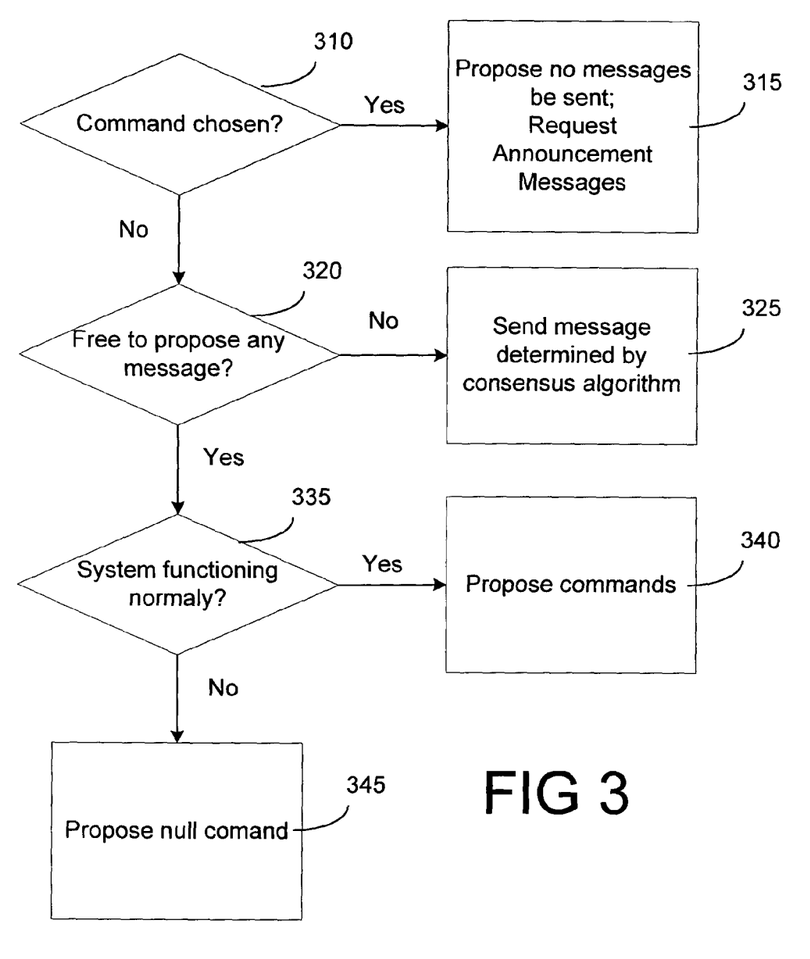
FIG. 3 is a flow chart illustrating an exemplary method for selecting a message for the virtual leader algorithm to propose for a particular phase 2 of the Paxos consensus algorithm in accordance with the present invention.

FIG. 3 is a flow chart illustrating an exemplary method for selecting a message for the virtual leader algorithm to propose for a particular phase 2 of the Paxos consensus algorithm. Note that this flow chart is specific to phase 2 of the Paxos algorithm, and the particular steps and decisions may differ depending on the chosen consensus algorithm. As described above, there may be several phases being executed simultaneously, each associated with a particular proposal for selecting a particular command number.

At 310, the server may determine whether a command has already been chosen for this command number. Any system, method, or technique known in the art for determining if a command has been chosen may be used. If a command has been chosen then the server may propose that no message be sent and the process continues at 315. Else, the process may continue at 320.

At 315, the server has determined that no message be sent. However, if the server believes that nonfaulty servers may have not yet learned the chosen command, then the proposal may also include an instruction that the servers send messages announcing their choice so that the nonfaulty servers may learn the chosen command. In asynchronous systems, servers typically acknowledge messages received from other server. Therefore, a server may assume that another server has not yet learned a chosen command because no acknowledgment has been received from that server so far.

These announcement messages may be sent as additional server messages and not as a message from the virtual leader. Any system, method, or technique known in the art for sending messages may be used.

At 320, the server has determined that a command should be chosen, and depending on whether or not the server chooses the proposed message, or if the consensus algorithm chooses the proposed message, the server may determine the value of the 2a message to propose. For example, the Paxos consensus algorithm may allow the leader to propose any value in its message.

If the leader is not free to propose the 2a message, then the embodiment desirably exits at 325 and the 2a message determined by the consensus algorithm is sent. Else, the embodiment may continue at 335.

At 335, the server may begin to choose the phase 2a message. The virtual leader may propose any command in the phase 2a message, and the server may determine what command the virtual leader may propose. As described above, the servers are cooperating to execute a state machine that executes sequence of commands received from clients. Let C be the set of all client commands that the server has received but that the server believes have not yet appeared in a sequence of commands that has already been chosen.

There are two subcases: (1) the server believes the system is functioning normally, meaning that the system is behaving synchronously and the Paxos algorithm is successfully choosing commands, or (2) the server believes that the system is not functioning normally and the Paxos algorithm is failing to choose state-machine commands. If the server believes the system is functioning normally, the embodiment desirably continues at 340. Else, the embodiment continues at 345.

At 340, the server desirably proposes that the virtual leader send a phase 2a message whose command is a sequence containing the client commands in C. It is not necessary to specify the order of those commands within the sequence.

At 345, the server desirably proposes that the virtual leader send a phase 2a message containing the null command or empty sequence of commands. The null command may be a special state machine command that does nothing. Case (2) is handled in this way for the following reason. If the system runs for kΔ seconds without choosing any commands, then the virtual leader may be sending messages for phases of k separate executions of the Paxos algorithm because the leader agreement algorithm will decide that the virtual leader should be initiating all those phases. Sending all those logical messages is not in itself a problem, since they are packaged in a single actual message. It is a problem only if those logical messages contain a lot of information. As long as no new client commands are being introduced in the virtual server's phase 2a messages, the amount of information being sent remains essentially constant, even though the number of separate instances of the consensus algorithm that are being executed keeps increasing.

As described above, the leader server utilized in the Paxos, or other asynchronous consensus algorithm, is substituted with a synchronous virtual leader agreement algorithm executed by each of the servers. Given that each instance of the virtual leader algorithm has proposed a set of commands to include in a message to each of the other instances for a particular phase, the virtual leader agreement algorithm must determine what commands are ultimately proposed in the message.

In the Paxos algorithm the phase 2a message may propose a sequence containing all of the client commands that have not already been chosen in a previous proposals. Because each server in its proposals desirably proposed the set of client commands that it believed had not been chosen, the virtual leader may select as its proposal the union of all the commands that were proposed by more than a threshold of servers. Alternatively, if no commands were proposed by more than a threshold of servers, the virtual leader may select as its proposal the empty sequence of commands, or null command.

Requiring that a particular command be proposed by more than the threshold of servers, ensures that the particular command was not invented by a malicious server (i.e., a Byzantine failure). Moreover, to protect against malicious clients, some verification of the particular client submitting the command may be desirable. For example, each server may check the identity of a particular client when it receives the command. The identity of the client may be checked using a digital signature, or any other system, method, or technique known in the art for authentication. Because no command is sent in the phase 2a message unless it has been proposed by more than the threshold amount of servers, assuming nonfaulty servers authenticate clients, no command will be executed from a client that has not been authenticated if fewer than the threshold of servers is faulty.

Exemplary Computing Environment

Figure 4:
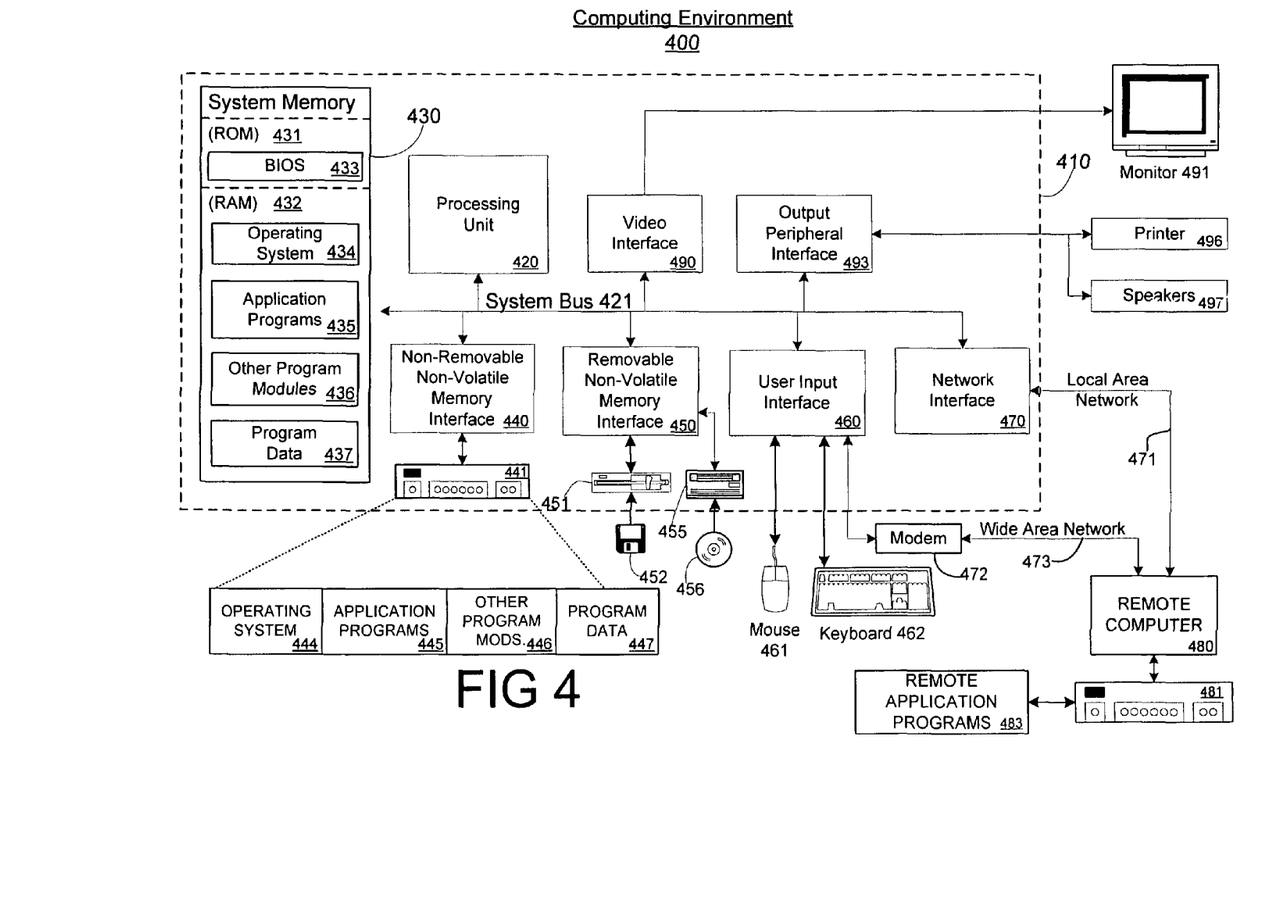
FIG. 4 is a block diagram representing an exemplary non-limiting computing device in which the present invention may be implemented.

FIG. 4 illustrates an example of a suitable computing system environment 400 in which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media. Computer readable media can be any available media that can be accessed by computer 410 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or non-volatile memory such as ROM 431 and RAM 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/non-volatile computer storage media. By way of example only, FIG. 4 illustrates a hard disk drive 441 that reads from or writes to non-removable, non-volatile magnetic media, a magnetic disk drive 451 that reads from or writes to a removable, non-volatile magnetic disk 452, and an optical disk drive 455 that reads from or writes to a removable, non-volatile optical disk 456, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted include a LAN 471 and a WAN 473, but may also include other networks. Such networking environments are commonplace in offices, enterprise-wide computer networks, intranets and the internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 483 as residing on memory device 481. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method of providing for a virtual leader for consensus in a distributed computing system, wherein the system comprises servers and clients, the method comprising:
    executing at least one virtual leader agreement algorithm in each server of a plurality of servers in the distributed computing system;
    determining at each server of the plurality of servers in the distributed system what message a leader in an asynchronous consensus algorithm should propose as the leader message;
    sending by each server of the plurality of servers in the distributed system the message proposed as the leader message to each of the other plurality of servers in the distributed system;
    combining the proposed leader messages at each server of the plurality of servers in the distributed system to generate a plurality of proposals;
    sending the plurality of proposals to the virtual leader agreement algorithm in each server of the plurality of servers in the distributed system;
    receiving the plurality of proposals at each virtual leader agreement algorithm in each server of the plurality of servers in the distributed system from each of the other plurality of servers in the distributed system;
    determining the leader message from the received plurality of proposals; and each server behaving as if it received the leader message from the leader,
    wherein determining the leader message from the received proposals comprises determining that no leader message should be sent if fewer than a threshold number of servers have proposed a particular leader message, and wherein the threshold number is greater than a number of malicious servers that the distributed computing system can tolerate.

2. The method of claim 1, wherein the proposed leader message has an associated phase in the asynchronous consensus algorithm, further wherein determining what message the leader in an asynchronous consensus algorithm should propose as the leader message comprises;
    if the proposed leader message is a phase 1 message, determining that the server should send a proposal number as the leader message;
    if the proposed leader message is a phase 2 message, determining that the server should send a message comprising commands that the server has received from clients but has not executed yet.

3. The method of claim 2, further comprising determining if the system is functioning normally, and if it is determined that the system is not functioning normally, determining that the server should send a message comprising an empty sequence.

4. The method of claim 1, wherein determining the leader message from the received proposals comprises determining that the leader message should be a union of client commands proposed in messages by more than a threshold number of servers.

5. The method of claim 1, wherein the asynchronous consensus algorithm is the Paxos algorithm.

6. The method of claim 1, wherein the asynchronous consensus algorithm is the Fast Paxos algorithm.

7. A computer-readable storage medium excluding carrier waves and transmission media with computer-executable instructions stored thereon for:
    executing at least one virtual leader agreement algorithm in each server of a plurality of servers in the distributed computing system;
    determining at each server of the plurality of servers in the distributed system what message a leader in an asynchronous consensus algorithm should propose as the leader message;
    sending by each server of the plurality of servers in the distributed system the message proposed as the leader message to each of the other plurality of servers in the distributed system;
    combining the proposed leader messages at each server of the plurality of servers in the distributed system to generate a plurality of proposals; sending the plurality of proposals to the virtual leader agreement algorithm in each server of the plurality of servers in the distributed system;
    receiving the plurality of proposals at each virtual leader agreement algorithm in each server of the plurality of servers in the distributed system from each of the other plurality of servers in the distributed system;
    determining the leader message from the received plurality of proposals; and each server behaving as if it received the leader message from the leader,
    wherein determining the leader message from the received proposals comprises determining that no leader message should be sent if fewer than a threshold number of servers have proposed a particular leader message, and wherein the threshold number is greater than a number of malicious servers that the distributed computing system can tolerate.

8. The computer-readable storage medium of claim 7, wherein the proposed leader message has an associated phase in the asynchronous consensus algorithm, further wherein determining what message the leader in an asynchronous consensus algorithm should propose as the leader message comprises computer-executable instructions for;

if the proposed leader message is a phase 1 message, determining that the server should send a proposal number as the leader message;

if the proposed leader message is a phase 2 message, determining that the server should send a message comprising all commands that the server has received from clients but has not executed yet.

9. The computer-readable storage medium of claim 8, further comprising computer-executable instructions for determining if the system is functioning normally, and if it is determined that the system is not functioning normally, determining that the server should send a message comprising an empty sequence.

10. The computer-readable storage medium of claim 7, wherein determining the leader message from the received proposals comprises computer-executable instructions for determining that the leader message should a union of commands proposed in messages by more than a threshold number of servers.

11. The computer-readable storage medium of claim 7, wherein the asynchronous consensus algorithm is the Paxos algorithm.

12. The computer-readable storage medium of claim 7, wherein the asynchronous consensus algorithm is the Fast Paxos algorithm.

13. A virtual leader system for providing for a virtual leader for consensus in a distributed computing system comprising servers and clients, the virtual leader system comprising:

a processor;

memory having stored therein instructions executable by the processor for: executing at least one virtual leader agreement algorithm in each server of a plurality of servers in the distributed computing system;

determining at each server of the plurality of servers in the distributed system what message a leader in an asynchronous consensus algorithm should propose as the leader message;

sending by each server of the plurality of servers in the distributed system the message proposed as the leader message to each of the other plurality of servers in the distributed system;

combining the proposed leader messages at each server of the plurality of servers in the distributed system to generate a plurality of proposals;

sending the plurality of proposals to the virtual leader agreement algorithm in each server of the plurality of servers in the distributed system;

receiving the plurality of proposals at each virtual leader agreement algorithm in each server of the plurality of servers in the distributed system from each of the other plurality of servers in the distributed system;

determining the leader message from the received plurality of proposals; and each server behaving as if it received the leader message from the leader, wherein determining the leader message from the received proposals comprises determining that no leader message should be sent if fewer than a threshold number of servers have proposed a particular leader message, and wherein the threshold number is greater than a number of malicious servers that the distributed computing system can tolerate.

14. The virtual leader system of claim 13, wherein the asynchronous consensus algorithm is the Paxos algorithm.

15. The virtual leader system of claim 13, wherein the asynchronous consensus algorithm is the Fast Paxos algorithm.

* * * * *